US008686844B1

(12) United States Patent
Wine

(10) Patent No.: US 8,686,844 B1
(45) Date of Patent: Apr. 1, 2014

(54) METHODS, DEVICES, AND MEDIUMS ASSOCIATED WITH RISK MANAGEMENT OF VEHICLE OPERATION

(75) Inventor: David Wine, Seattle, WA (US)

(73) Assignee: Intellectual Ventures Fund 79 LLC, Las Vegas, NV (US)

(*) Notice: Subject to any disclaimer, the term of this patent is extended or adjusted under 35 U.S.C. 154(b) by 281 days.

(21) Appl. No.: 13/171,835

(22) Filed: Jun. 29, 2011

(51) Int. Cl.
*B60Q 1/00* (2006.01)

(52) U.S. Cl.
USPC .......... 340/439; 340/438

(58) Field of Classification Search
USPC .......... 340/439, 438
See application file for complete search history.

(56) References Cited

U.S. PATENT DOCUMENTS

| | | | | |
|---|---|---|---|---|
| 5,465,079 | A * | 11/1995 | Bouchard et al. | 340/576 |
| 5,797,134 | A * | 8/1998 | McMillan et al. | 705/400 |
| 6,868,386 | B1 * | 3/2005 | Henderson et al. | 705/4 |
| 6,931,309 | B2 * | 8/2005 | Phelan et al. | 701/1 |
| 7,821,421 | B2 * | 10/2010 | Tamir et al. | 340/901 |
| 7,890,353 | B2 | 2/2011 | Wahlbin et al. | |
| 8,180,655 | B1 * | 5/2012 | Hopkins, III | 705/4 |
| 2002/0111725 | A1 * | 8/2002 | Burge | 701/29 |
| 2002/0128882 | A1 * | 9/2002 | Nakagawa et al. | 705/4 |
| 2002/0178033 | A1 * | 11/2002 | Yoshioka et al. | 705/4 |
| 2005/0091175 | A9 * | 4/2005 | Farmer | 705/400 |
| 2010/0030586 | A1 * | 2/2010 | Taylor et al. | 705/4 |

* cited by examiner

*Primary Examiner* — Daniel Wu
*Assistant Examiner* — Emily C Terrell
(74) *Attorney, Agent, or Firm* — Stolowitz Ford Cowger LLP

(57) ABSTRACT

A system may be configured to receive input indicating an operating condition associated with a vehicle. One or more environmental parameters of vehicle operation may be identified and compared with the operating condition to determine a safety rating of the vehicle operation based, at least in part, on the comparison. The safety rating may be assigned to an account associated with an operator of the vehicle.

48 Claims, 5 Drawing Sheets

METHODS, DEVICES, AND MEDIUMS ASSOCIATED WITH RISK MANAGEMENT OF VEHICLE OPERATION

BACKGROUND

Known systems that assess the risk of operating a vehicle may evaluate a driver's risk according to generalized information including the driver's age and the type of vehicle the driver is driving. The generalized information may be obtained, for example, when the driver registers with an insurance company. The known systems may assign the same risk to two or more individuals having similar generalized information.

Additionally, known systems may adjust the level of risk assigned to a driver after the occurrence of an event, such as after the driver receives a traffic citation or after the driver is involved in a traffic accident. Nevertheless, the known systems are limited with respect to determining in advance the risks associated with a particular driver.

DETAILED DESCRIPTION

Figure 1:
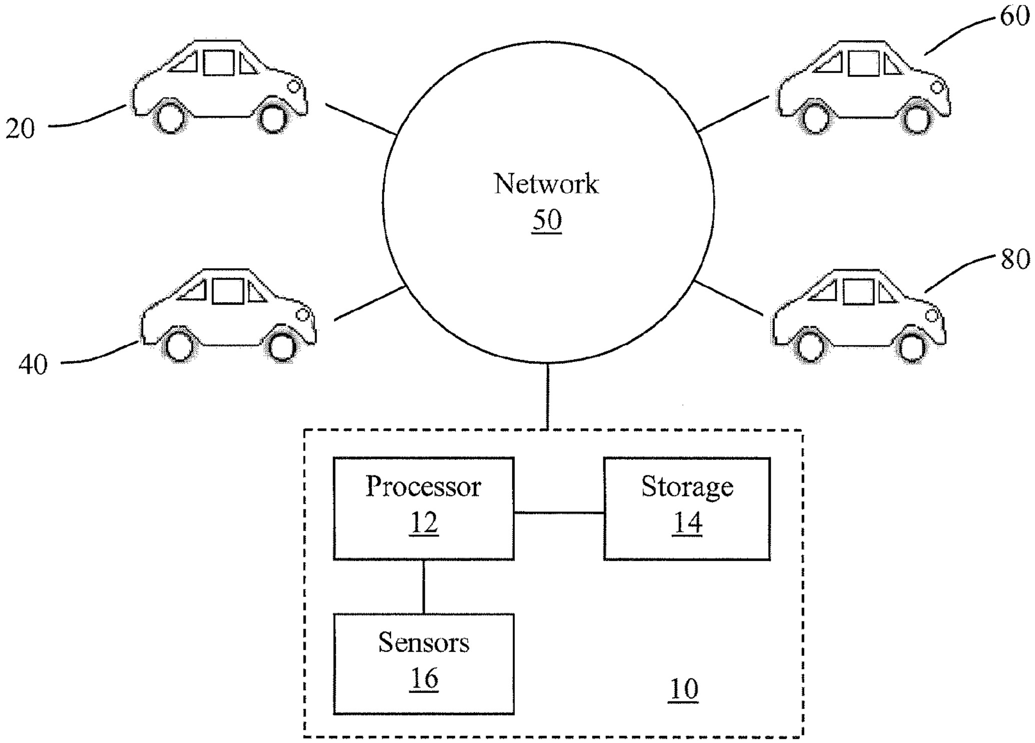
FIG. 1 depicts a diagram of an example of a network associated with risk management services.

FIG. 1 depicts a diagram of an exemplary network 50 associated with risk management services. A plurality of vehicles, for example, vehicles 20, 40, 60, and 80, may be operatively coupled to network 50. Vehicles 20, 40, 60, and 80 may be associated with one or more network subscribers. In one example, at least one of vehicles 20, 40, 60, and 80 may be associated with an out-of-network user. Vehicles 20, 40, 60, and 80 may be an automobile, a truck, an industrial vehicle, a motorcycle, a bicycle, an airplane, a boat, a train, other modes of transportation, or any combination thereof.

Network 50 may comprise a public network or a private network established for personal use, business use, governmental use, or any combination thereof. For example, network 50 may comprise a cable network, a satellite network, a cellular network, a telephone network, a broadband network, a voice over Internet (VoIP) network, or any combination thereof. Furthermore, network 50 may comprise a wired network, a wireless network, a local area network, a wide area network, a virtual network, or any combination thereof.

Network 50 may be operatively coupled to an apparatus 10 configured to provide risk management services for one or more vehicles, such as vehicles 20, 40, 60, and/or 80. Apparatus 10 may be associated with a network subscriber and may be installed on a vehicle associated with the network subscriber. In one example, apparatus 10 may be operated by a service provider. Apparatus 10 may comprise a server or a central processing unit. Furthermore, apparatus 10 may be located at or near an intersection, such as, a traffic light, a road sign, an overpass, a bridge, a toll booth, a tower, an office, other vehicles, or any combination thereof.

Apparatus 10 may be operatively coupled to a vehicle, such as vehicles 20, 40, 60, and/or 80 via network 50. Apparatus 10 may comprise a processing device 12 and one or more storage devices, such as a storage device 14. Apparatus 10 may further comprise one or more sensors 16 (herein after referred to as sensors 16). Sensors 16 may be configured to identify, sense, determine, read, receive, transmit, communicate, provide, acquire, and/or detect an input indicating an operating condition. The operating condition may be associated with one or more vehicles, such as vehicles 20, 40, 60, and/or 80. In one example, sensors 16 may be configured to identify, sense, determine, read, receive, transmit, communicate, provide, acquire, and/or detect one or more environmental parameters of vehicle operation.

Apparatus 10 may be associated with a communication device, and may be configured to receive and/or transmit data over network 50 from/to one or more of vehicles, such as vehicle 20, 40, 60, and/or 80. For example, apparatus 10 may be configured to receive audio data, text data, video data, or any combination thereof. Storage device 14 may be configured to save the data, the input associated with the operating condition, and/or the one or more environmental parameters of vehicle operation.

Storage device 14 may be configured to store instructions, and processing device 12 may be configured to execute the instructions stored in storage device 14. In response to executing the instructions, processing device 12 may receive input indicating an operating condition associated with a vehicle. Processing device 12 also may be configured to determine the operating condition based, at least in part, on the input.

The input may be received from sensors 16. In one example, the input may be received from sensors 16 located on a first vehicle, such as vehicle 20. In another example, the input may be received from sensors 16 not located on first vehicle 20, such as sensors 16 located on a second vehicle 40, and the input may comprise an evaluation of operation of first vehicle 20 by an operator associated with second vehicle 40. The input may comprise a text message and processing device 12 may be configured to display the text message to an operator of first vehicle 20. Sensors 16 further may comprise a stationary sensing device, such as a radar gun. Input may be received from a plurality of vehicles and/or sensing devices.

Processing device 12 may be configured to identify one or more environmental parameters of vehicle operation, and to compare the operating condition with the one or more environmental parameters. A safety rating may be associated with an operator based, at least in part, on a driving record. Processing device 12 further may be configured to weight the one or more environmental parameters in accordance with the safety rating. The safety rating may be updated based, at least in part, on the above-described comparing.

By way of example, assume that first vehicle 20 is engaging in risky behavior such as travelling too close to, i.e., "tailgating," second vehicle 40. The operator of first vehicle 20 may be relatively skilled at driving and may have good reaction times, such that in most instances there are no adverse consequences associated with the risky behavior of the operator of first vehicle 20. However, if the operator of second vehicle 40 forcibly applies the brakes to avoid hitting a squirrel running across the street, the operator of first vehicle 20 may not have sufficient time to brake before hitting second vehicle 40 due to the inadequate travelling distance therebetween. The cost of first vehicle 20 travelling too close to second vehicle 40 may increase from zero to a substantial amount in a relatively short period of time due to the accident. The cost may comprise an increase insurance premium, a cost of vehicle repair, a medical cost, other costs, or any combination thereof.

There are a number of features or tools that may provide an operator of a vehicle with information to minimize the consequences of, and/or prevent, collisions. For example, automated headlights may alternate between normal and high beams according to the detection of oncoming traffic, and cruise control may maintain the vehicle at a constant travel speed. Air bags, three-point seatbelts, and reinforced body construction may be provided to protect the operator in the event of an accident.

The cost associated with getting in an accident may deter the operator of first vehicle 20 from engaging in similar risky behavior in the future. However, the operator may not have known that they were in fact driving too close to second vehicle 40 prior to the accident, despite advances in radar and other technologies that provide information associated with following distance based on local driving conditions and travelling speeds.

While the existence of technology may reduce the number of accidents and/or minimize the associated cost, the operator may elect to ignore certain technological features, such as by disabling the automated headlights or refusing to buckle the seatbelt. The technology further may create a risk-normalizing behavior, such that the operator may fail to pay as much attention to their driving if they believe they are made safe by the technology. Providing the operator with additional information specific to the operating conditions and/or environmental parameters may provide the operator with more relevant and contemporaneous guidance as to the level of risk of their driving.

Figure 2:
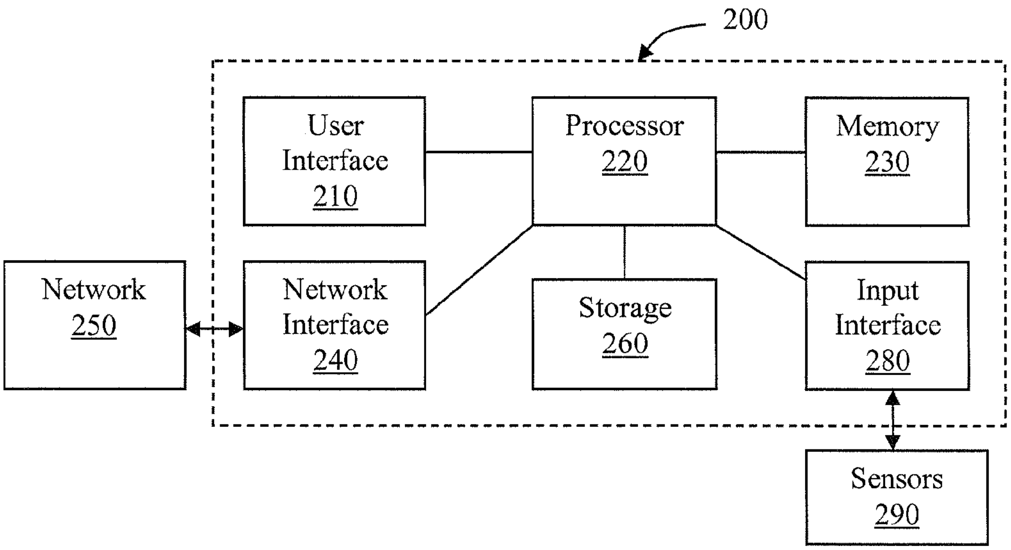
FIG. 2 depicts an example of an apparatus configured to provide risk management services.

FIG. 2 depicts an example of an apparatus 200 configured to provide risk management services. Apparatus 200 may comprise a processing device 220 operatively coupled to a memory device 230, a storage device 260, a network interface 240, a user interface 210, and an input interface 280.

Network interface 240 may comprise electronic circuits or programs configured to interface or communicate with a network 250, such as a wired network, a wireless network, or any combination thereof. In one example, and substantially similar to network 50 as depicted in FIG. 1, network 250 may operatively couple a plurality of communication devices or vehicles, such as vehicles 20, 40, 60, and/or 80.

Memory device 230 may be configured to store instructions associated with an application program and/or service. Storage device 260 may be configured to store account balances, safety ratings, vehicle identifications, vehicle operation histories, subscriber information, outgoing messages, incoming messages, fines, vehicle locations, vehicle operating conditions, environmental parameters, or any combination thereof.

Processing device 220 may be configured to execute the stored instructions. Processing device 220 may access memory device 230, storage device 260, or any combination thereof, to run, store, and archive one or more programs. Memory device 230 and/or storage device 260 may comprise RAM, ROM, or other types of storage or memory devices.

Processing device 220 may be configured to manage risks and/or costs associated with, and/or assigned to, one or more vehicles and/or operators, e.g., users or subscribers. Processing device 220 further may be configured to receive input or commands from an operator via user interface 210, and may be configured to receive input from one or more sensors 290 (herein after referred to as sensors 290) via input interface 280.

User interface 210 may comprise a voice system configured to process messages and/or operator commands. In one example, user interface 210 may comprise a display. User interface 210 may be operatively coupled to, or may comprise, a computer, a television, a monitor, a smart-phone, a plasma screen, a LCD screen, a projection screen, or the like, or any combination thereof. User interface 210 may be configured to display account balances, safety ratings, vehicle identifications, vehicle operation histories, subscriber information, outgoing messages, incoming messages, fines, vehicle locations, vehicle operating conditions, environmental parameters, other information, or any combination thereof.

Input interface 280 may be configured to interface, or receive input from, one or more sensors, such as sensors 290. Sensors 290 may be installed on a vehicle. In one example, sensors 290 may be configured to obtain information on passing vehicles, for example, when sensors 290 are located in proximity to a road or throughway. Sensors 290 may be located at or near an intersection, a traffic light, a road sign, an overpass, a bridge, a toll booth, a tower, a building, other structures, or any combination thereof. Sensors 290 may be configured to obtain data on an operating condition associated with a vehicle and/or vehicles. In one example, sensors 290 may be configured to obtain data on an environmental parameter associated with vehicle operation.

Processing device 220 may be configured to receive input indicating an operating condition associated with a vehicle, and to identify one or more environmental parameters of vehicle operation. Processing device 220 further may be configured to compare the operating condition with the one or more environmental parameters, and to determine a safety rating of the vehicle operation based, at least in part, on the above-described comparing. In one example, the operating condition may comprise a travelling speed of the vehicle, a following distance between the vehicle and a second vehicle, an un-signaled lane change, a failure to stop at a traffic signal, an unsafe passing technique, driving while intoxicated, driving while talking on a cell phone, failing to yield to a pedestrian, or any combination thereof. The one or more environmental parameters may comprise a posted speed limit, a time of day, a weather condition, or any combination thereof.

Some of the identified operating conditions may not, strictly speaking, be in violation of any local laws; rather, the activities may be identified as falling outside of an acceptable range of behavior associated with safe vehicle operation. In one example, the operating condition may comprise a reaction time associated with braking the vehicle. For example, apparatus 200 may be configured to sense an object located in front of the vehicle, and detect a braking signal. The reaction time may comprise a measured time between the above-described sensing and the above-described detecting. Processing device 220 further may be configured to assign the safety rating to an account associated with the vehicle.

Figure 3:
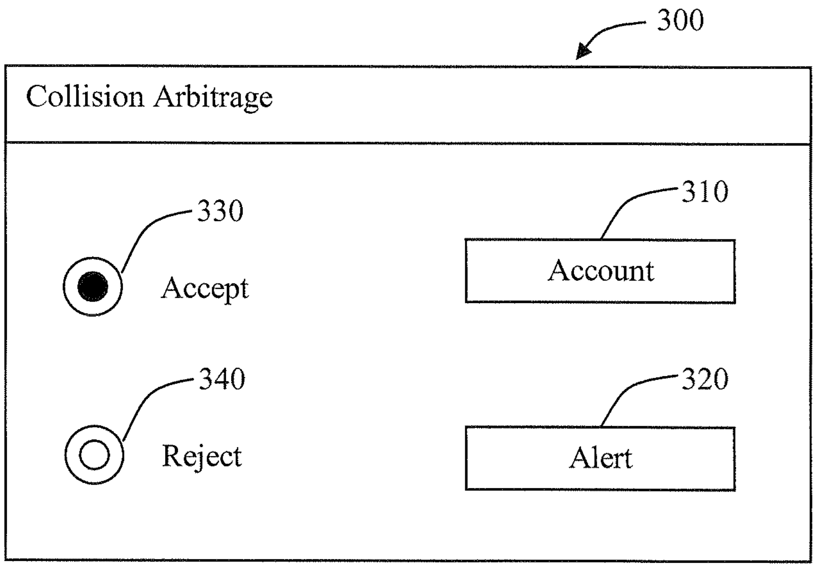
FIG. 3 depicts an example of a user interface configured to provide services associated with vehicle operation.

FIG. 3 depicts an example of a user interface 300 configured to provide services associated with vehicle operation. User interface 300 may be operatively coupled to, or may comprise, a display device, a computer, a television, a monitor, a smart-phone, a plasma screen, a LCD screen, a projection screen, an audio system, an on-board operator system, a communication system, a voice activated system, a key entry system, a text entry system, or any combination thereof.

The service options may be user-selectable. User interface 300 may be configured to display, indicate, and/or otherwise provide information associated with the services. For example, user interface 300 may be configured to display an account status 310 associated with an account and/or a subscriber. Account status 310 may comprise an account balance, a credit balance, a currency amount, a score, a rating, other user information, or any combination thereof. For example, account status 310 may be configured to display or otherwise indicate a range of values. A high value may be associated with a good driving record, and a low value may be associated with a poor driving record.

User interface 300 further may comprise an alert indicator 320. Alert indicator 320 may comprise an alert or message associated with the account and/or subscriber. For example, in response to comparing an operating condition with one or more environmental parameters, alert indicator 320 may display a warning that the operating condition has, or will, result in a reduced value of account status 310.

In one example, alert indicator 320 may indicate a request to change account status 310. The operator may be asked to accept a reduction in account status 310 in response to the identification of an operating condition associated with a high risk of vehicle operation. Furthermore, the operator may be asked to accept an increase in account status 310 in response to the identification of an operating condition associated with a lower risk of vehicle operation.

An accept command 330 may be selected to accept the change to account status 310. In one example, accepting the change to account status 310 may be associated with a change in the subscriber's account, such as a change in an insurance policy, and/or the acceptance of a charge and/or a fine. A reject command 340 may be selected to reject the change to account status 310, and/or to reject the charge and/or the fine. The selection of reject command 340 may deter any costs associated with the operating condition until, for example, an insurance policy is due for renewal, at which time the insurance premium may increase.

The information provided by user interface 300 may be used to alert or warn the operator of a risky vehicle operation and/or an unsafe driving condition, and the information, or associated data, may be sent to a service provider. For example, if a first vehicle is following too close to a second vehicle, information related to the vehicle operation may be sent to the service provider, e.g., an insurance company, to an operator of the second vehicle, to a plurality of vehicles located in proximity to the first vehicle, or any combination thereof. The information related to the vehicle operation may be provided by a visible indicator that may be located on the first vehicle, such as a flashing light, a flashing vehicle license plate, or the like. The visible indicator may be configured to warn other drivers that the operator of the first vehicle may be driving erratically or in an unsafe manner. The information may be sent substantially contemporaneously with the occurrence of the vehicle operation. A charge and/or fine may be assessed if the operator continues to engage in the risky behavior.

By monitoring vehicle operation and/or an unsafe driving conditions in real-time, costs may be accrued before any accident or collision actually occurs. Providing the information to the operator(s) and/or service provider may deter continued risky behavior and also help spread the associated costs out over time. The information provided to the operator(s) and/or service provider may provide a way to decrease both the overall cost and the severity of the accident by allowing a small incremental cost to be paid in proportion to instances of the risky behavior, regardless if the risky behavior results in an accident, instead of accruing the entire cost of the risky behavior after the accident occurs. The associated costs may be more fairly distributed between operators according to their driving behavior, rather than simply based on actual accidents that happen to occur in a given period of time. Furthermore, the frustration and anger that may be exhibited in the form of 'road rage' and/or other behavior may be decreased by allowing the operator of a vehicle to communicate with other operators.

In one example, a vehicular risk management system may be configured to evaluate or arbitrage the risk associated with vehicle speed limits. For example, assume that a posted speed limit on a freeway is 55 miles per hour. Many people tend to drive five or ten miles per hour over the speed limit, e.g., 60 or 65 miles per hour. A first fee may be associated with a first range of travel speeds, and a second, higher fee may be associated with a second range of travel speeds. The first fee may allow people to pay a relatively small fee for the convenience of saving time while driving at speeds marginally greater than the posted speed limit, and the second fee may be substantially higher than the first fee to discourage travel speeds deemed to be risky or unsafe.

Alert indicator 320 may comprise an audible and/or text alert of a potential fine and/or remedial action that may be performed. For example, alert indicator 320 may indicate to the operator of an upcoming speed zone, and that failure to slow down to the speed limit may result in a speed-based fine. Alert indicator 320 may reward the operator for coming into compliance with the traffic law by providing, for example, a message of appreciation, such as "Nice job Dave, thanks for being a safe driver."

Figure 4:
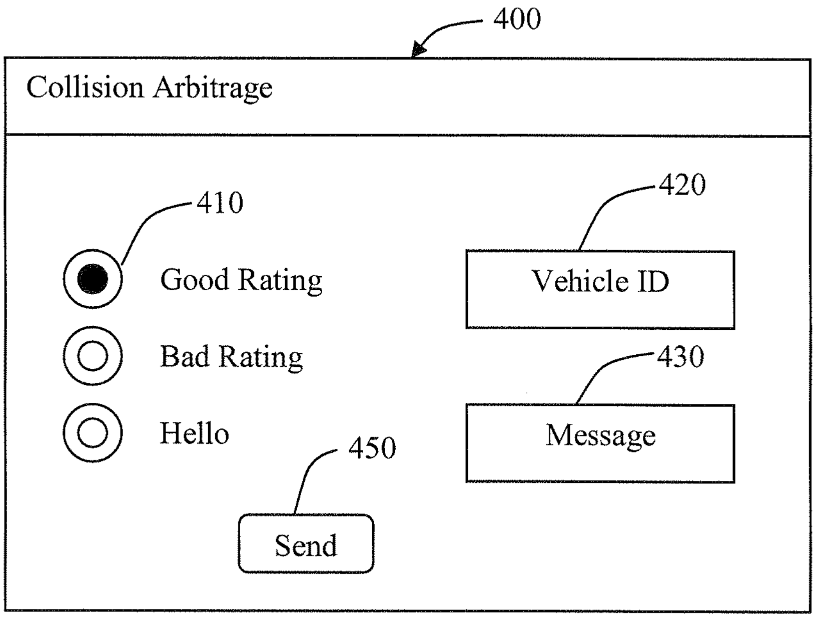
FIG. 4 depicts a further example of a user interface configured to provide services associated with vehicle operation.

FIG. 4 depicts a further example of a user interface 400 configured to provide services associated with vehicle operation. User interface 400 may operate substantially similar to user interface 300, depicted in FIG. 3, except as described herein. Apparatus 400 may be configured to display, indicate, and/or otherwise provide information associated with risk management services.

User interface 400 may comprise a vehicle identification 420 and a message 430. Vehicle identification 420 may be associated with a vehicle and/or an operator who receives or transmits message 430. For example, user interface 400 may be associated with a first vehicle, and vehicle identification 420 may be associated with a second vehicle. The first vehicle may receive message 430 from the second vehicle, and user interface 400 may display both vehicle identification 420 of the second vehicle and message 430 sent by the second vehicle. Message 430 may comprise vehicle-to-vehicle communication, allowing an operator of the second vehicle to express satisfaction or dissatisfaction to the operator of the first vehicle. For example, in response to the first vehicle travelling too close to the second vehicle, the operator of the second vehicle may transmit a message to the first vehicle such as "Please travel at a safe following distance."

In one example, user interface 400 may be configured to transmit message 430 to the second vehicle associated with vehicle identification 420. An operator associated with the first vehicle may select one or more options 410 associated with sending message 430 to the second vehicle. Message 430 may comprise a rating and/or an evaluation of a vehicle operation associated with the second vehicle, or a greeting as part of a social networking service. A send option 450 may be selected to send options 410, vehicle identification 420, message 430, or any combination thereof.

Vehicle operation and/or ratings may be reported to different groups depending on the severity, number, and/or history of the vehicle operations. For example, a rating associated with relatively minor risky behavior may be reported to a social networking group, a rating associated with intermediate risky behavior may be reported to an insurance company, and a rating associated with highly risky behavior may be reported to a law enforcement agency. Safe vehicle operating practices may be incentivized by providing a graduated cost structure, e.g., fees and/or penalty, for increasingly risky behavior.

Information transmitted to, and/or received by, one or both of user interfaces 300, 400 may also be provided to, and/or transmitted from, a service provider. A log or record may be maintained over time of account status 310, alert indicator 320, vehicle identification 420, message 430, or any combination thereof, to generate a subscriber history. Options 410 may indicate a relative approval or disapproval with the vehicle operation of another vehicle. For example, options 410 may comprise a rating scale indicating how well the operator of the second vehicle may be driving. The rating may be positive, e.g., good, or negative, e.g., bad. Message 430 may identify a type of vehicle operation related to the rating.

In one example, a risk management system may reward operators who consistently avoid engaging in risky behavior. For example, an account of a first operator who maintains a safe following distance, or who demonstrates defensive driving in response to a second operator who may be driving aggressively, may be credited if they were otherwise obeying the traffic laws. The first operator may receive the credit from the second operator's account, since the first operator may have been subjected to a risk not of their own making. In one example, the second operator that drives aggressively over a period of time may be assigned a radius of potential damage, and other operators who enter the radius of potential damage may get credited from the second operator's account.

A service provider may use account status 310, alert indicator 320, vehicle identification 420, message 430, or any combination thereof, to evaluate an operator's behavior. The service provider may obtain this information from a plurality of vehicles other than the operator being evaluated, and the plurality of operators may evaluate each other as a type of peer rating system. The evaluations may be weighted according to the individual rating assigned to the operator providing the information, for example, as an indication as to how reliable the information may be.

Figure 5:
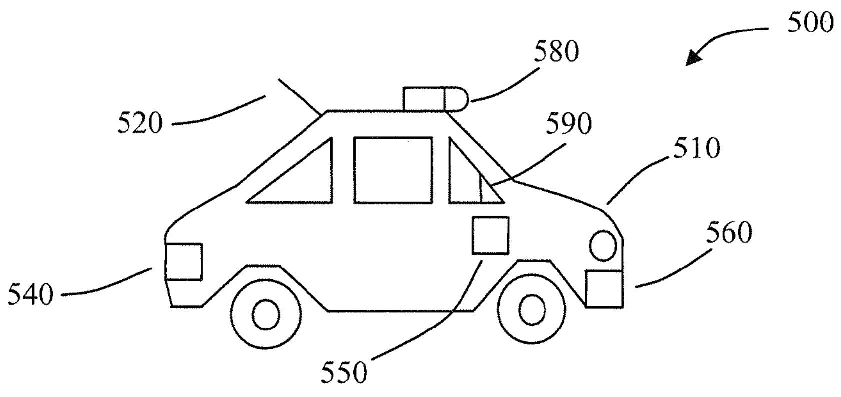
FIG. 5 depicts an example of a risk management system installed on a vehicle.

FIG. 5 depicts an example of a risk management system 500 installed on a vehicle 510. System 500 may comprise a processing device 550. Processing device 550 may be configured to run, store, and/or archive one or more programs. In one example, processing device 550 may be configured to store a record of vehicle operation over time, providing a subscriber history. System 500 may be configured to manage costs and/or risks associated with, and/or assigned to, one or more vehicles and/or operators.

System 500 may comprise one or more sensors, such as a rear sensor 540 and a front sensor 560, which may be configured to detect objects located behind or in front of vehicle 510, respectively. In one example, one or both of sensors 540, 560 may be configured to identify, sense, determine, read, receive, transmit, communicate, provide, acquire, and/or detect a vehicle speed, a vehicle position, a vehicle travel distance, a vehicle identification, a weather condition, a speed limit, a traffic condition, a vehicle operation, an environmental parameter, or any combination thereof.

System 500 may comprise a user interface 590 and a communication device 520. User interface 590 may operate substantially similar as user interface 300 and/or user interface 400 as depicted by FIG. 3 and FIG. 4, respectively. User interface 590 may be provided as a stand-alone or aftermarket device, or may be integrated into vehicle 510. Communication device 520 may be configured to transmit and/or receive information, such as account status 310, alert indicator 320, vehicle identification 420, message 430, or any combination thereof. In one example, system 500 may comprise a camera 580 mounted to, or otherwise attached to, vehicle 510.

Camera 580 may be configured to capture images and/or data associated with operating conditions and/or environmental parameters. For example, camera 580 may be configured to capture or read the posted speed limit and/or other posted traffic signs or information. In one example, processing device 550 may be configured to store and/or obtain information associated with local traffic laws including speed limits. In one example, communication device 520, camera 580, and/or one or more sensors 540, 560 may be configured to wirelessly receive a communication from a traffic device, such as a variable speed sign. The traffic device may indicate, for example, a reduced traffic speed due to construction, traffic congestion, and/or a traffic accident.

System 500 may credit the operator's account for complying with the reduced speed, for maintaining a lane position in a construction area, for driving in the right lane when being passed, for driving in the passing lane when passing a vehicle, for changing out of a lane adjacent a stopped emergency vehicle, for performing other vehicle operations associated with safe driving, or any combination thereof. The operator's account may be debited for vehicle operations associated with risky or undesirable behavior. For example, an account associated with a vehicle that may be traveling in the center lane while being passed by a vehicle located in the right lane may be debited for failure to stay right except when passing.

Processing device 550 further may be configured to identify the local traffic laws based, in part, on a location of vehicle 510. The location of vehicle 510 may be determined from a global positioning system and/or from visual data obtained from camera 580. Processing device 550 may be configured to compare the input received from one or more of sensors 540, 560 to the local traffic laws to determine if vehicle 510 may be operated according to the local traffic laws. Rules associated with the comparison may be varied according to environmental conditions such as the weather and/or the time of day.

In one example, system 500 may be configured to provide for autonomous operation of vehicle 510. For example, processing device 550 may use input received from communication device 520, sensor 540, sensor 560, camera 580, or any combination thereof, to control acceleration, braking, steering, climate control, lights, other vehicle operations, or any combination thereof. Operators who decide to disable the autonomous operation of vehicle 510 may elect to operate vehicle 510 themselves. The operators may then be licensed, according to the rating system described above, on the basis of their driving habits and abilities. For example, the operator may be evaluated based on a comparison of their own driving behavior with that of the autonomous operation of vehicle 510.

Figure 6:
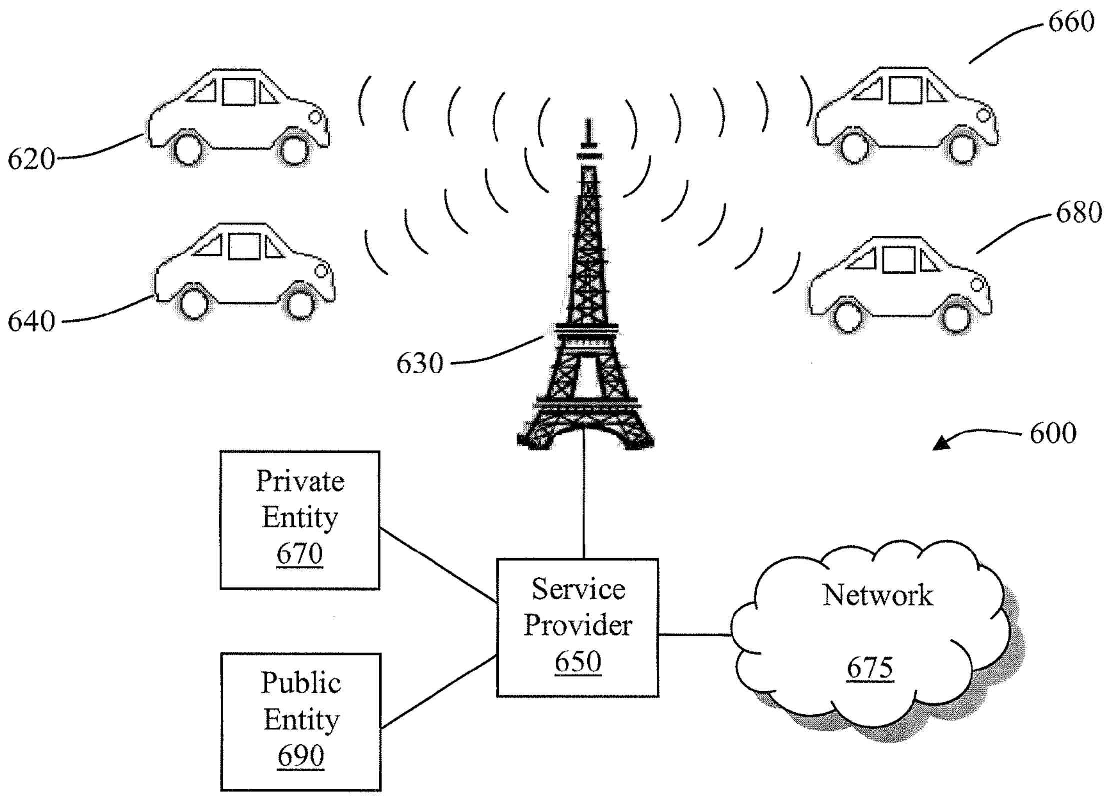
FIG. 6 depicts an example of a risk management system including a service provider.

FIG. 6 depicts an example of a risk management system 600 including a service provider 650. Service provider 650 may comprise a media service provider, a cable service provider, a satellite service provider, a cellular service provider, an insurance service provider, a rental service provider, a statistics service provider, a survey service provider, a social media service provider, an advertising service provider, a broadband service provider, or any combination thereof.

Service provider 650 may be operatively coupled to a network 675. Network 675 may comprise a public network and/or a private network established for personal use, business use, governmental use, or any combination thereof. For example, network 675 may comprise a subscriber network, a cable network, a satellite network, a cellular network, a telephone network, a broadband network, a voice over Internet (VoIP) network, or any combination thereof. Furthermore, network 675 may comprise a wired network, a wireless network, a local area network, a wide area network, a virtual network, or any combination thereof.

Service provider 650 may be associated with one or more vehicles, such as a first vehicle 620. Service provider 650 may be operatively coupled to first vehicle 620 and one or more vehicles, such as vehicles 640, 660, and/or 680 via one or more transponders, such as a transponder 630. Service provider 650 may be configured to receive and/or transmit a transmission over transponder 630 from/to one or more vehicles, such as vehicles 620, 640, 660, and/or 680.

Service provider 650 further may be operatively coupled to a private entity 670 and/or a public entity 690. Private entity 670 may comprise a business, such as an insurance company, a rental company, a statistics company, a survey company, a social media company, an advertisement company, other types of companies, or any combination thereof. Public entity 690 may comprise a governmental agency, such as a city agency, a state agency, a federal agency, a law enforcement agency, a health agency, a safety agency, other types of agencies, or any combination thereof.

System 600 may comprise a memory device configured to store vehicle operation data associated with a plurality of accounts, and a processing device. In one example, system 600 may be configured to receive input indicating an operating condition associated with a vehicle, such as first vehicle 620, and to identify an account associated with first vehicle 620. System 600 further may be configured to identify a location of first vehicle 620, and to compare the operating condition with at least one environmental parameter associated with the location. Based, at least in part, on the above-described comparing, system 600 may be configured to determine a safety rating of vehicle operation. An account associated with first vehicle 620 may be updated with the safety rating.

In one example, the at least one environmental parameter may comprise a traffic law, for example a speed limit, and the safety rating may indicate a violation of the traffic law. An association of the at least one environmental parameter and the location may be stored in a memory device. Prior to comparing the operating condition with the at least one environmental parameter, system 600 may be configured to select the at least one environmental parameter based on the identification of the location.

The input indicating an operating condition may be transmitted from a device located on first vehicle 620, and the input may indicate a rate of travel of first vehicle 620. In one example, the input may indicate a subscriber, such as an owner and/or operator of first vehicle 620, and the account may be associated with the subscriber.

System 600 may be configured to identify a second vehicle, such as second vehicle 640, located in proximity to first vehicle 620. A second account balance associated with second vehicle 640 may be adjusted based, at least in part, on the safety rating associated with first vehicle 620. System 600 further may be configured to evaluate the safety rating associated with first vehicle 620 with a second safety rating associated with second vehicle 640. The account balance and the second account balance may be adjusted based, at least in part, on the above-described evaluating. For example the account balance associated with first vehicle 620 may be debited, and the second account balance may be credited.

In one example, system 600 may be configured to evaluate a history of operation associated with first vehicle 620 based, at least in part, on the history or histories of operation associated with other vehicles, such as vehicles 640, 660, and/or 680. For example, first vehicle 620 may be used to commute to and from a place of business. First vehicle 620 may leave in the morning and return in the evening on a regular schedule. Other vehicles may also be used for commuting on or about the same time that first vehicle 620 may be operating. For example, the owner associated with second vehicle 640 may live nearby the owner associated with first vehicle 620, and both owners may depart for their commute at approximately the same time every morning. Carpool groups may be defined and/or redefined based on changing vehicle driving patterns, and the vehicles associated with a carpool group may get collectively rated on a trip-by-trip basis. Membership in a carpool group may be based, at least in part, on an individual rating associated with a particular vehicle.

An account may be credited or debited depending on a level of risk associated with a group of other vehicles, such as vehicles 640, 660, and/or 680, which share the commute with first vehicle 620. For example, an account associated with first vehicle 620 may be credited if the history of operation associated with second vehicle 640 indicates safe driving behavior. Alternatively, the account associated with first vehicle 620 may be debited if the history of operation associated with second vehicle 640 indicates risky driving behavior. Similarly, the account balance associated with first vehicle 620 may be affected by other vehicles, e.g., vehicles 660, 680.

In one example, system 600 may be configured to determine a fine based, at least in part, on the safety rating. Data corresponding to a history of the vehicle operation may be accumulated, and the fine further may be determined based, at least in part, on comparing the accumulated data with a threshold value. For example, if an operator of a vehicle makes a driving mistake, or engages in risky behavior during the beginning of a trip but drives safely the rest of the trip, any cost associated with the initial mistake may be forgiven and/or offset by the safe driving, and the net cost associated with the trip may be zero.

System 600 further may be configured to disable a vehicle based, at least in part, on the driving record associated with the operator. For example, system 600 may be configured to determine that a vehicle ignition is turned off, and the vehicle ignition may be disabled from turning back on. In the case of actual traffic infractions, a warning and/or a ticket may be sent directly to the offending vehicle. For example, a law enforcement agent may send the ticket without stopping the vehicle, and thereby may avoid causing traffic congestion and other safety issues associated with having two vehicles pulled over to the side of the road.

System 600 and/or service provider 650 may be configured to perform some or all of the operations described with reference to processing device 12, processing device 220, and/or processing device 550 as depicted by FIGS. 1, 2, and 5, respectively.

Figure 7:
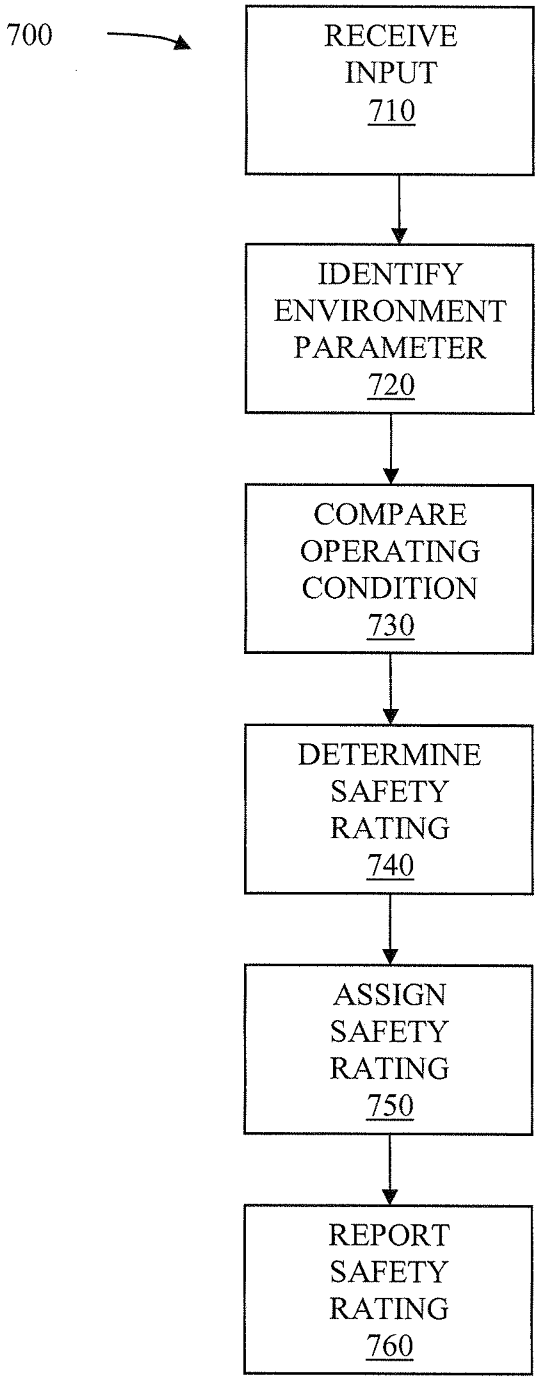
FIG. 7 depicts an example of a process for providing risk management services.

FIG. 7 depicts an example of a process 700 for providing risk management services. At operation 710, input indicating an operating condition associated with a vehicle may be received. The operating condition may comprise a travelling speed of the vehicle, a following distance between the vehicle and a second vehicle, an un-signaled lane change, a failure to stop at a traffic signal, an unsafe passing technique, driving while intoxicated, driving while talking on a cell phone, failing to yield to a pedestrian, or any combination thereof.

At operation 720, at least one environmental parameter of vehicle operation may be identified. The at least one environmental parameter may comprise a posted speed limit, a time of day, a weather condition, or any combination thereof.

At operation 730, the operating condition may be compared with the at least one environmental parameter. At operation 740, a safety rating of the vehicle operation may be determined based, at least in part, on the above-described comparing.

At operation 750, the safety rating may be assigned to an operator of the vehicle. An account balance associated with the operator may be adjusted based, at least in part, on the safety rating.

At operation 760, the safety rating may be reported to a public entity or a private entity, such as an insurance company. In one example, the safety rating may be reported to the operator and/or to one or more other vehicles located in proximity to the vehicle.

Figure 8:
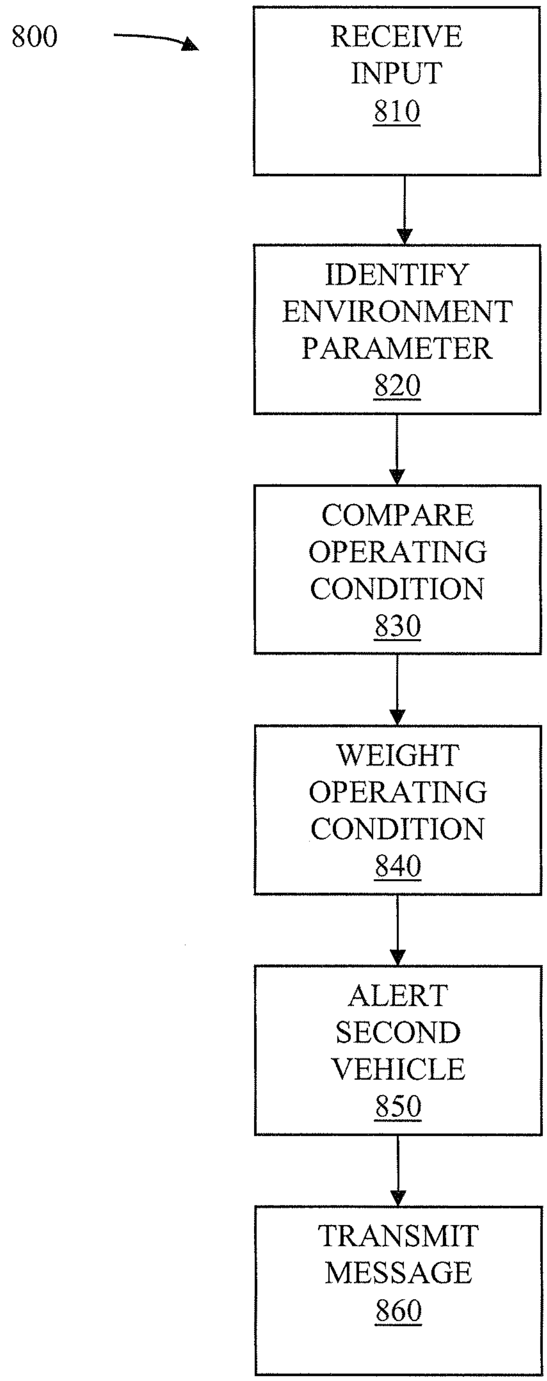
FIG. 8 depicts a further example of a process for providing risk management services.

FIG. 8 depicts a further example of a process 800 for providing risk management services. At operation 810, input indicating an operating condition associated with a vehicle, such as a first vehicle, may be received. At operation 820, one or more environmental parameters of vehicle operation may be identified.

At operation 830, the operating condition may be compared with the one or more environmental parameters to determine a safety rating of the vehicle operation based, at least in part, on the above-described comparing. The safety rating may be assigned to an account associated with an operator of the first vehicle.

At operation 840, the operating condition may be weighted based on a driving record associated with the operator. The driving record associated with the operator may comprise a history of vehicle operations and associated levels of safety.

At operation 850, a second vehicle may be alerted of the safety rating. The one or more environmental parameters may comprise a driving record associated with a second operator. The second operator may be associated with a second vehicle in local proximity to the first vehicle.

At operation 860, a text message may be transmitted to the second vehicle. The text message may comprise an identification of the first vehicle associated with transmitting the message to the second vehicle.

The exemplary process 700 depicted by FIG. 7, the exemplary process 800 depicted by FIG. 8, and the associated operations described therein, may be performed by one or more processing devices, such as processing device 12, processing device 220, processing device 550, and/or system 600 as depicted by FIGS. 1, 2, 5, and 6, respectively.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. One or more of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a conventional rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of various examples, it should be apparent that the examples may be modified in arrangement and detail without departing from such principles. We claim all modifications and variation coming within the spirit and scope of the following claims.

The invention claimed is:

1. A method comprising:

receiving, by a processing device, an input from a first vehicle indicating an operating condition associated with the first vehicle;

identifying, by the processing device, at least one environmental parameter of vehicle operation for the first vehicle;

comparing, by the processing device, the operating condition with the at least one environmental parameter;

determining, by the processing device, a safety rating of the vehicle operation for the first vehicle based, at least in part, on said comparing and on a safety evaluation selectively determined contemporaneously with the operating condition by a second operator operating a second vehicle within a local proximity of the first vehicle; and assigning, by the processing device, the safety rating to a first operator of the first vehicle.

2. The method of claim 1, further comprising reporting, by the processing device, the safety rating to an insurance company associated with the first operator.

3. The method of claim 1, further comprising weighting, by the processing device, the safety evaluation in determining the safety rating of the first vehicle based on a safety rating associated with the second operator.

4. The method of claim 1, further comprising reporting, by the processing device, an indication of the safety rating from the first vehicle to one or more additional vehicles in proximity to the first vehicle.

5. The method of claim 1, further comprising:

determining, by the processing device, the safety rating contemporaneously with receiving the safety evaluation determined by the second operator; and adjusting, by the processing device, an account balance associated with the first operator based, at least in part, on the safety rating.

6. The method of claim 5, further comprising adjusting, by the processing device, a second account balance associated with the second vehicle while the second vehicle is within the local proximity to the first vehicle based, at least in part, on the safety rating.

7. The method of claim 6, wherein adjusting the account balance comprises redirecting at least some of the account balance into the second account balance contemporaneously with identifying the second vehicle within the local proximity of the first vehicle.

8. The method of claim 7, further comprising evaluating, by the processing device, the safety rating with a second safety rating associated with the second vehicle, wherein the at least some of the account balance is transferred into the second account balance based, at least in part, on said evaluating.

9. The method of claim 1, further comprising determining, by the processing device, a fine based, at least in part, on the safety rating.

10. The method of claim 1, further comprising:

receiving, by the processing device, the safety evaluation in a vehicle-to-vehicle communication sent from the second vehicle to the first vehicle; and displaying, by the processing device, the safety evaluation on a user interface within the first vehicle.

11. A memory device having instructions stored thereon that, in response to execution by a processing device, cause the processing device to perform operations comprising:

receiving an input from a vehicle indicating an operating condition associated with the vehicle;

identifying one or more environmental parameters of vehicle operation;

comparing the operating condition with the one or more environmental parameters;

determining a safety rating of the vehicle operation based, at least in part, on said comparing and based on a safety evaluation provided contemporaneously with the operating condition by an additional operator operating an additional vehicle within a local proximity of the vehicle;

assigning the safety rating to an account associated with the vehicle; and sending the safety rating from the vehicle to the additional vehicle.

12. The memory device of claim 11, wherein the operating condition comprises a travelling speed of the vehicle.

13. The memory device of claim 11, wherein the operations further comprise weighting the safety evaluation in determining the safety rating of the vehicle based on a safety rating of the additional operator.

14. The memory device of claim 12, wherein the one or more environmental parameters comprises a time of day.

15. The memory device of claim 12, wherein the one or more environmental parameters comprises a weather condition.

16. The memory device of claim 11, wherein the operating condition comprises a following distance between the vehicle and the additional vehicle.

17. The memory device of claim 11, wherein the operating condition comprises a reaction time for braking the vehicle.

18. The memory device of claim 17, wherein the operations further comprise:

sensing an object located in front of the vehicle; and detecting a braking signal, wherein the reaction time comprises a measured time between said sensing and said detecting.

19. The memory device of claim 11, wherein the operating condition comprises an un-signaled lane change.

20. The memory device of claim 11, wherein the operating condition comprises a failure to stop at a traffic signal.

21. An apparatus, comprising:

a memory device configured to store instructions; and a processing device that, in response to executing the instructions stored in the memory device, is configured to:

receive an input indicating an operating condition associated with a first vehicle substantially contemporaneously with the operating condition;

identify one or more environmental parameters of vehicle operation;

compare the operating condition with the one or more environmental parameters;

determine a safety rating of the first vehicle operation based, at least in part, on said comparing; and a safety evaluation received from a second operator operating a second vehicle within a vicinity of the first vehicle; and assign the safety rating to a first operator associated with the first vehicle.

22. The apparatus of claim 21, wherein the safety evaluation comprises at least one of a good and/or bad safety determination selected by the second operator.

23. The apparatus of claim 21, wherein the input is received from at least one sensor located off of the first vehicle.

24. The apparatus of claim 22, wherein the at least one sensor comprises a radar gun.

25. The apparatus of claim 22, wherein the at least one sensor is located on the second vehicle.

26. The apparatus of claim 21, wherein the input is received from the second vehicle.

27. The apparatus of claim 21, wherein the processing device is further configured to:

decrease a first account of the first operator by a first amount based on the safety rating; and increase a second account of the second operator by a second amount proportional to the first amount.

28. The apparatus of claim 21, wherein the safety evaluation includes a text message, and wherein the processor is further configured to display the text message to the first operator.

29. The apparatus of claim 21, wherein the processing device is further configured to weigh the safety evaluation in determining the safety rating of the first vehicle based on a safety rating of the second operator.

30. The apparatus of claim 21, wherein the input is received from a plurality of vehicles, and wherein the processing device is further configured to determine the operating condition based, at least in part, on the input.

31. An apparatus, comprising:

means for receiving an input indicating an operating condition associated with a vehicle substantially contemporaneously with the operating condition;

means for identifying one or more environmental parameters of vehicle operation;

means for comparing the operating condition with the one or more environmental parameters to determine a safety rating of the vehicle operation based, at least in part, on said comparing, wherein the safety rating is assigned to an account associated with an operator of the vehicle; and means for sending an alert associated with the safety rating from the vehicle to a second vehicle within a local proximity of the vehicle.

32. The apparatus of claim 31, wherein the means for comparing comprises means for weighting the operating condition based on a driving record associated with the operator.

33. The apparatus of claim 32, wherein the driving record associated with the operator comprises a history of vehicle operations and associated levels of safety.

34. The apparatus of claim 33, further comprising means for disabling the vehicle based, at least in part, on the driving record associated with the operator.

35. The apparatus of claim 34, wherein the means for disabling comprises means for determining that a vehicle ignition is turned off, and wherein the vehicle ignition is disabled from turning back on.

36. The apparatus of claim 32, wherein the one or more environmental parameters comprises a driving record associated with a second operator, and wherein the means for comparing comprises means for weighting the one or more environmental parameters based on the driving record associated with the second operator.

37. The apparatus of claim 36, wherein the second operator is associated with the second vehicle within the local proximity to the vehicle.

38. The apparatus of claim 31, further comprising means for transferring at least some amount from the account associated with the operator to a second account associated with a second operator of the second vehicle based on the safety rating.

39. The apparatus of claim 31, wherein the means for sending the alert comprises means for transmitting a text message to the second vehicle.

40. The apparatus of claim 39, wherein the text message includes an identification of the vehicle.

41. A system, comprising:

a memory device configured to store vehicle operation data associated with a plurality of accounts; and a processing device, configured to:

receive an input from a first vehicle indicating an operating condition associated with the first vehicle substantially contemporaneously with the operating condition;

identify a first account associated with the first vehicle;

identify a location of the first vehicle;

compare the operating condition with at least one environmental parameter associated with the location;

determine a safety rating of the first vehicle based, at least in part, on said comparing;

identify a location of a second vehicle as within a range of the first vehicle; and transfer some amount of the first account into a second account associated with the second vehicle based on the safety rating of the first vehicle.

42. The system of claim 41, wherein the at least one environmental parameter comprises a traffic law.

43. The system of claim 42, wherein the traffic law comprises a speed limit.

44. The system of claim 42, wherein the safety rating indicates a violation of the traffic law.

45. The system of claim 41, wherein an association of the at least one environmental parameter and the location of the first vehicle is stored in the memory device, and wherein, prior to comparing the operating condition with the at least one environmental parameter, the processor is further configured to select the at least one environmental parameter based on the identification of the location.

46. The system of claim 41, wherein the input is transmitted from a device located on the first vehicle.

47. The system of claim 46, wherein the input indicates a rate of travel of the first vehicle.

48. The system of claim 41, wherein the processing device is further configured to determine the safety rating based on a safety evaluation of the first vehicle selectively input by an operator of the second vehicle.

* * * * *